United States Patent
Duffield et al.

(10) Patent No.: US 12,461,903 B2
(45) Date of Patent: *Nov. 4, 2025

(54) MULTI-DIMENSIONAL TIME SERIES DATASETS

(71) Applicant: Palantir Technologies Inc., Denver, CO (US)

(72) Inventors: Benjamin Duffield, New York, NY (US); David Tobin, Atherton, CA (US); Hasan Dincel, London (GB); Mihir Pandya, Palo Alto, CA (US); Stephen Nicholas Barton, New York, NY (US); Samantha Woodward, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/016,972

(22) Filed: Jan. 10, 2025

(65) Prior Publication Data

US 2025/0147945 A1 May 8, 2025

Related U.S. Application Data

(63) Continuation of application No. 16/895,447, filed on Jun. 8, 2020, now Pat. No. 12,229,104.

(30) Foreign Application Priority Data

Jun. 6, 2019 (GB) ...................................... 1908091

(51) Int. Cl.
G06F 16/22 (2019.01)
G06F 16/2455 (2019.01)
(Continued)

(52) U.S. Cl.
CPC ...... *G06F 16/2264* (2019.01); *G06F 16/2455* (2019.01); *G06F 16/24573* (2019.01); *G06F 16/248* (2019.01); *G06F 16/283* (2019.01)

(58) Field of Classification Search
CPC .......... G06F 16/2264; G06F 16/24573; G06F 16/2455; G06F 16/283; G06F 16/248
See application file for complete search history.

(56) References Cited

U.S. PATENT DOCUMENTS 10,417,224 B2 9/2019 Duffield et al.
11,387,730 B2 7/2022 Everts
(Continued)

OTHER PUBLICATIONS

U.S. Appl. No. 17/814,466, Time Series Database Processing System, filed Jul. 22, 2022.
(Continued)

*Primary Examiner* — William P Bartlett
(74) *Attorney, Agent, or Firm* — Knobbe, Martens, Olson & Bear, LLP

(57) ABSTRACT

A method may comprise receiving a query for performing one or more computational operations on one or more multi-dimensional data sets representing multi-dimensional time series data collected in real-time from one or more sensors associated with one or more technical systems. The method may also comprise identifying the location of the one or more multi-dimensional time series data sets in one or more databases, retrieving the one or more multi-dimensional time series data sets from the identified one or more databases, and performing the one or more computational operations on the retrieved one or more multi-dimensional time series data sets. The method may also comprise generating output based on the result of the one or more computational operations indicative of one or more states of the one or more technical systems with respect to time.

18 Claims, 7 Drawing Sheets

(51) Int. Cl.
*G06F 16/2457* (2019.01)
*G06F 16/248* (2019.01)
*G06F 16/28* (2019.01)

(56) References Cited

U.S. PATENT DOCUMENTS

| | | |
|---|---|---|
| 11,397,730 B2 | 7/2022 | Duffield et al. |
| 12,229,104 B2 | 2/2025 | Duffield et al. |
| 2014/0258527 A1* | 9/2014 | Takenaka ............. G06F 16/248 |
| | | 709/224 |
| 2014/0277656 A1* | 9/2014 | Nixon ................ G05B 19/4185 |
| | | 700/95 |
| 2015/0286969 A1* | 10/2015 | Warner ............. G06Q 10/0633 |
| | | 705/7.27 |
| 2016/0357828 A1* | 12/2016 | Tobin .................. G06F 16/2477 |
| 2023/0009836 A1 | 1/2023 | Duffield et al. |

OTHER PUBLICATIONS

Zhang et al., "Semantically enhanced time series databases in IoT-Edge-Cloud infrastructure", Arxiv.org, Cornell University Library, XP081027330, pp. 1-12 (2019).
Official Communication for European Patent Application No. 20178735.5 dated Jul. 24, 2024, 7 pages.

\* cited by examiner

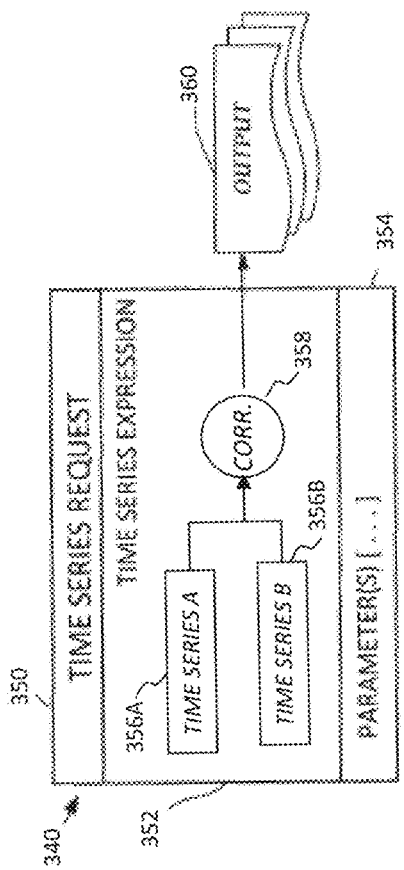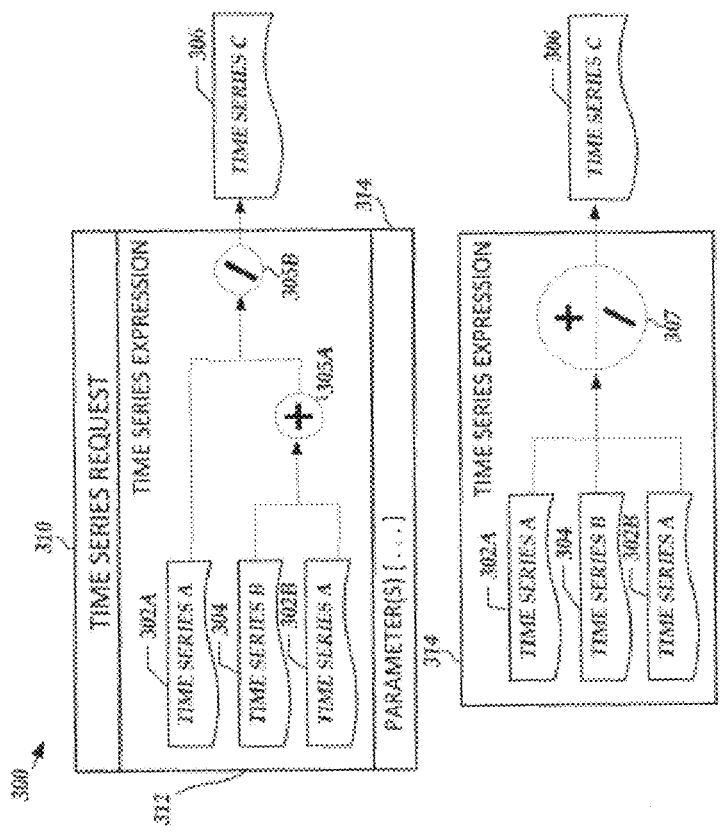
FIG. 3A
FIG. 3B
FIG. 3C

MULTI-DIMENSIONAL TIME SERIES DATASETS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure relates to a method and systems relating to time series databases.

BACKGROUND

A database may store a large amount of time series data. A time series is a series of data points indexed in time order. Time series data may represent, or be combined to represent, multi-dimensional time series data, that is a series of at least two different variables data types corresponding to a plurality of time values.

SUMMARY

According to an example embodiment, there is provided a method, performed by one or more processors, the method comprising:
  receiving a query for performing one or more computational operations on one or more data sets representing multi-dimensional time series data collected in real-time from one or more sensors associated with one or more technical systems;
  identifying the location of the one or more multi-dimensional time series data sets in one or more databases;
  retrieving the one or more multi-dimensional time series data sets from the identified one or more databases;
  performing the one or more computational operations on the retrieved one or more multi-dimensional time series data sets; and
  generating multi-dimensional output based on the result of the one or more computational operations, the multi-dimensional output being indicative of one or more states of the one or more technical systems with respect to time.

The method may be performed by a middleware analysis platform, independently of real-time data collection by the one or more multi-dimensional databases.

The middleware analysis platform may perform retrieval and computation substantially in real time from receiving the query.

The middleware analysis platform may identify the location of the one or more multi-dimensional time series data sets in the one or more databases by accessing metadata associated with the one or more multi-dimensional time series data sets in the one or more databases, said one or more databases being pre-registered with the middleware analysis platform, the metadata including an identifier of the one or more multi-dimensional time series data sets and their respective storage location in the one or more databases.

The middleware analysis platform may convert the received query into an expression for performing the one or more computational operations locally.

The middleware analysis platform may generate multi-dimensional output from the one or more computations which are presented on one or more multi-dimensional graphs.

A plurality of multi-dimensional graphs may be presented, representing a sequence of time slices.

The one or more graphs may be multi-dimensional scatter plots.

The one or more computations may include one or more of correlation, regression and derivatives.

The method may further comprise monitoring the output against an predetermined condition, and issuing an alert and/or performing an automatic operation on the one or more technical systems responsive to the condition being detected.

The method may further comprise: receiving, from the one or more sensors, real-time streaming data representing one or more multi-dimensional time series data sets, the one or more sensors being associated with one or more technical systems; parsing the one or more multi-dimensional time series data sets to provide said data sets in a predetermined structure; and storing said data sets in one or more time series databases.

The real-time streaming data may comprise a plurality of streams, each associated with a respective sensor, the respective dimension relating to a time-varying quantity or parameter measured or detected by the sensor at a plurality of time intervals.

The method may further comprise cleaning the received real-time streaming data prior to parsing and storing in the one or more time series databases.

Parsing may comprise structuring the real-time streaming data using an ontology associated with the respective sensor from which the streaming data is received, prior to storing in the one or more time series databases.

The receiving, parsing and storing may be performed substantially in real time.

The method may further comprise storing the received real-time streaming data, prior to parsing, in a cold storage means and, in response to subsequently identifying one or more sets of missing data stored in the one or more time series databases, identifying and retrieving data corresponding to the missing data from the cold storage means and inserting said retrieved data into the parsed data to provide updated data in the time series databases.

According to another embodiment, there may be provided a computer program, optionally stored on a non-transitory computer readable medium program which, when executed by one or more processors of a data processing apparatus, causes the data processing apparatus to carry out a method according to any preceding method definition.

According to another example embodiment, there may be provided an apparatus configured to carry out the method according to any preceding method definition, the apparatus comprising one or more processors or special-purpose computing hardware.

BRIEF DESCRIPTION OF THE DRAWINGS

Example embodiments will now be described by way of non-limiting example with reference to the accompanying drawings, in which:

FIGS. 3A-3C show schematic diagrams of example time series requests and time series expressions, according to some embodiments of the present disclosure;

DETAILED DESCRIPTION

Figure 1A:
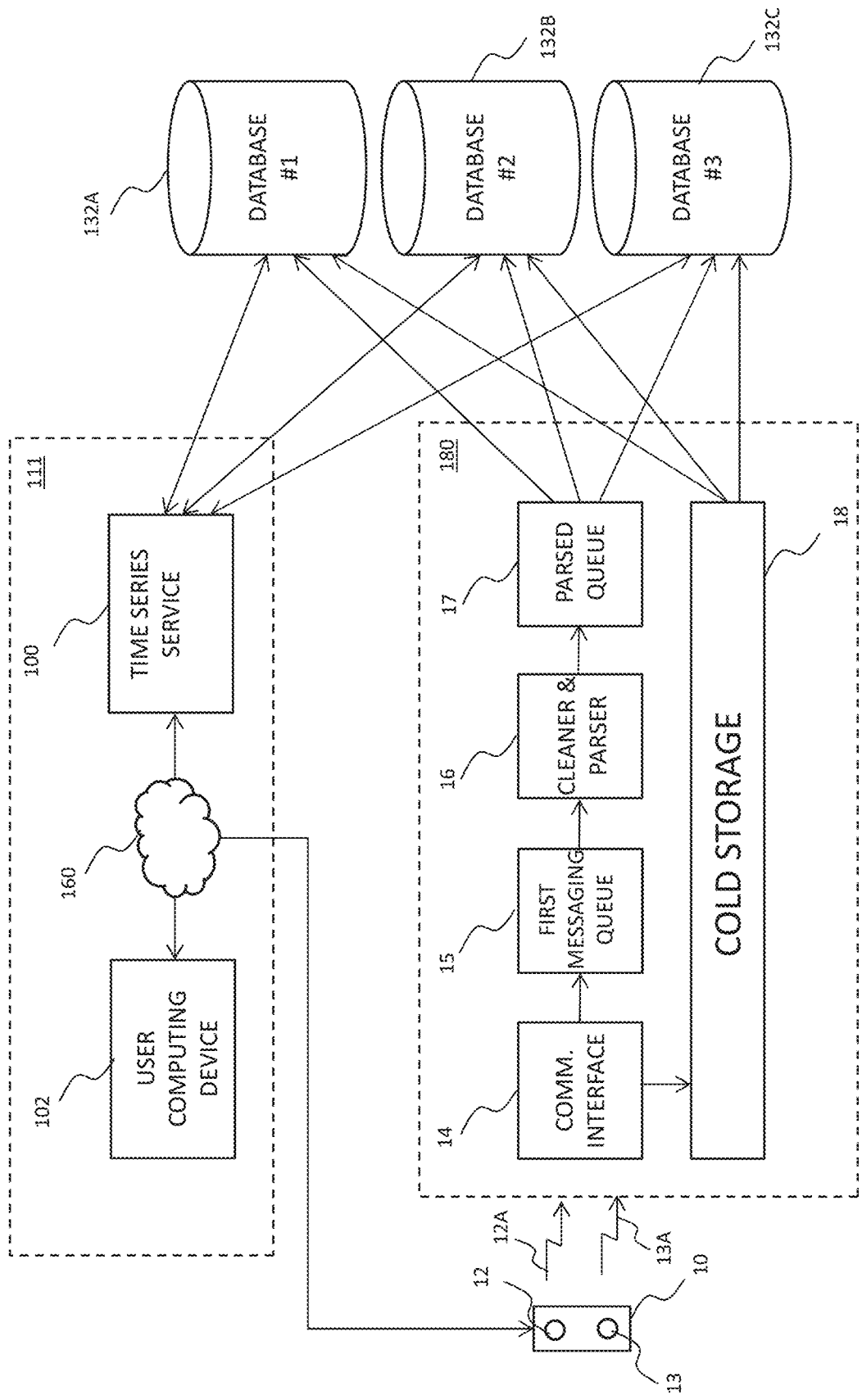
FIG. 1A is a schematic diagram of an overall system for providing real-time multi-dimensional data analysis to one or more users, according to some embodiments of the present disclosure.

Example embodiments relate to time series databases. A time series may be considered a series of data points in time order. Time series data may represent, or be combined to represent, multi-dimensional time series data, that is a series of at least two different variables corresponding to a plurality of time values.

For example, sensor systems monitoring processes or operations of a technical system can collect time series data, which may include large numbers of sensed data samples and a corresponding time indication of when each data sample was collected. Time series data may be related to a number of characteristics and properties, for example, including temperature, pressure, pH, light, infrared (IR), ultraviolet (UV), acceleration, dissolved oxygen, optical clarity, CO2, motion, rotational motion, vibration, voltage, current, capacitance, electromagnetic radiation, altitude, fluid flow, radiation, optical, and moisture, proximity and the like.

Such time series data may be used to perform analysis, for example to identify conditions occurring on particular parts of a technical system or process, or at different systems comprising part of an overall global system. The conditions may comprise beneficial conditions or adverse conditions, such as faults or hazardous incidents. The existence of a particular condition may only become evident if analysed in context, for example using multi-dimensional data plotted on a scatter graph or using related correlation or regression analysis. For example, in a particular technical system, a condition whereby a temperature measurement exceeds a particular temperature may not in itself be of concern. If, however, a pressure measurement occurring at the same time exceeds a particular pressure, the two occurrences at the same time, or at approximately the same time, may indicate a situation beyond what is expected at that time, which may prompt immediate or near-immediate notification. This may prompt an operator to shut down one or more systems and/or automatically shut down one or more systems as a precaution. In another example, a sensor may be generating relatively benign measurements, for example indicating a relatively constant temperature within expected levels; if however that temperature does not correlate in the context of another sensor measurement over time, e.g. a rising pressure, the two sets of time-series data may indicate that one of said sensors is faulty and needs investigation and/or replacement.

In this respect, example embodiments relate to real-time analysis of multi-dimensional time series data. In most cases, there may be three dimensions, comprising time as one dimension and two other measured variables as the other dimensions. The use of two dimensions provides context as to what is being analysed.

Sensors may sample data very frequently, for example hundreds or thousands of times per second. It follows that the amount of data may be very large, as well as possibly having inherent noise and being unstructured such that subsequent analysis may be time-consuming and not particularly suited to real-time analytics.

In mission critical applications, users may wish to perform particular analyses on time-series data in a real-time way, albeit with the option to go 'back in time' to look at previously-stored time-series data. For example, users may wish to provide one or more computational queries for retrieving one or more multi-dimensional data sets, performing one or more computations or transforms on the multi-dimensional data sets for contextual analysis, and receiving output of the computations or transforms, substantially in real-time from when the data is available in a structured data storage means, such as in one or more multi-dimensional databases.

The term "real-time" may take account of certain network latencies, and hence the term "substantially" may be used to allow data to be received, analysed and output generated in a matter of, for example, less than one minute from it being written to the data storage means.

Overview

A time series database can be queried. The time series database may include time series data captured from one or more sensors. A system that allows users to analyze time series data may include a database server and a user computing device. The user computing device may provide information to the database server regarding the type of analysis desired by the user. In examples herein, the type of analysis may be one of correlation or regression analysis for identifying a relationship between two or more dimensions of time-varying sensor data. This may be termed contextual analysis. The database server may retrieve the appropriate data from the database, perform the analysis, and provide the results to the user device for display. The user may attempt to analyze a single set of time series data (for example, data measured by a single sensor and/or captured from a single data source over a period of time) or multiple sets of time series data (for example, data measured by multiple sensors and/or captured from multiple data sources over a period of time). In examples herein, by performing correlation or regression analysis, the analysis is contextual and hence outliers representing unexpected results in the multi-dimensional data can be used to signal potentially erroneous or hazardous conditions, or faulty data sources. The time series data may be associated with one or more time units and/or the time series data may be stored at a particular frequency, such as 50 or 60 hertz. Such analysis may include viewing the time series data at different periods of time, viewing the time series data at different zoom levels, simultaneously viewing different time series data over the same time period, combining (for example, adding, subtracting, dividing, multiplying, determining a ratio, determining a zScore, determining a square root, etc.) different time series data to generate new time series data.

Disclosed herein are systems and methods that may be used to advantageously improve time-series-related functionality, particularly in relation to multi-dimensional time series data for real-time analysis. A multi-dimensional time series may represent two or more variables with respect to a common time axis. The non-time variables may be measurements received from respective sensors, which are combined or summed, or from a single sensor that is capable of measuring two or more variables.

One or more of the time series databases mentioned herein may be a multi-dimensional database. A multi-dimensional database is a database that is a special type of database, optimized for online analytical processing (OLAP) applications. A multi-dimensional database may be considered in terms of a time-sensitive OLAP n-dimensional structure, e.g. a cube when n=3, which may comprise any number of dimensions, relating to respective variables, where one of those variables is time. Operations may be performed on the OLAP cube by means of so-called slicing, for example to reduce an n-dimensional data point to an n−1 dimensional data point. For example, for n=3, by taking a time slice, we have two dimensions resulting data points representing variations in those two dimensions at the point in time the time slice was taken. As above, examples of pressure and temperature may be represented in a first time slice and, over time, variations in pressure and temperature may be analyzed over subsequent slices.

A time series database, whether a conventional relational database or multi-dimensional database, may be populated with data in substantially real-time from when the data is generated by one or more sensors. In some example embodiments, a technical system may include a plurality of sensors for measuring respective variables against a time index. Examples of such variables include temperature, pressure, pH, light, infrared (IR), ultraviolet (UV), acceleration, dissolved oxygen, optical clarity, CO2, motion, rotational motion, vibration, voltage, current, capacitance, electromagnetic radiation, altitude, fluid flow, radiation, optical, and moisture, proximity and the like. The sensors may be configured to transmit, in real-time, streams of measured data using, for example, one or more streaming clients or servers, to a pre-processing system which is configured to prepare the data for storage in one or more time series databases. As mentioned, the real-time streams may represent one or more variables with respect to a time index. The pre-processing system may, for example, perform cleaning and parsing of the streaming data substantially in real-time, prior to the parsed data being stored in the one or more time series databases. The parsing may structure the data from an unstructured format into a structured format, in accordance with an ontology particular to that sensor. We may refer herein to real-time data sets, and it is to be understood that a set may be refer to a particular batch or stream of data from a single sensor, and may represent one or more dimensions or variables contained within that sensor's stream with respect to the time index.

The one or more time series databases may be regarded as "hot storage" in relation to one or more other storage systems that may be referred to as "cold storage" systems. Although these are relative terms, it will be understood that hot storage refers to a storage system which uses memory technology for faster access (and is usually more expensive) than a cold storage system that uses memory technology for comparatively slower access (and is usually less expensive.) For example, a solid state memory may be regarded as hot storage relative to a mechanical hard disk drive, or cloud storage, which may be regarded as cold storage. In this regard, the pre-processing system may also comprise, or access, a cold storage system for the pre-processing system to store at least unparsed real-time data sets and possibly "dirty" data that has not been cleaned at the pre-processing system when received from the one or more sensors. The purpose of the cold storage system is to provide a means for updating data that, for example, may be found to be missing or in error when stored in the one or more time series databases. In such a case, the pre-processing system may perform a roll-back to acquire data corresponding to the missing or erroneous data to provide the updated data.

Once stored in the one or more time series databases, subsequent analysis may be performed by an independent platform, referred to as a time series service. The analysis may also be performed substantially in real-time.

The time series service is a platform that operates independently from the pre-processing system and the one or more time series databases. Its general function is to receive queries, to process those queries to identify where in the one or more time series databases required data is stored, which time series databases may be pre-registered with the time series service, the processing including performing one or more computations or transforms on multi-dimensional data to produce multi-dimensional output, for example in graphical form. This retrieval and computation/transformation for output may be performed substantially in real-time. Hence, the effect of the overall system is to provide a computer-implemented means for performing real-time analysis on real-time sensor data, which real-time analysis uses multi-dimensional time series data to contextualize the time varying data and which may therefore be used to notify users of one or more predetermined situations derivable based on the context. Typically, this analysis will be correlation and/or regression analysis and may produce as graphical output one or more scatter plots to indicate one or more outliers indicating a condition requiring attention.

The time series service may receive and respond to requests from external applications and/or libraries on behalf of one or more time series databases. The time series service may function as a middleware analysis platform or layer. The time series service may receive initial time series queries and may generate planned queries from the initial queries. The planned queries may efficiently query the one or more multi-dimensional time series databases. The time series service can enable time series operations between time series data sets of different units by automatically performing interpolation and/or normalization. The time series service can also identify which of multiple time series databases to query based on efficiency and/or trigger population or hydration of time series data from, for example the cold storage system, if the data is missing in a database.

The systems and methods described herein may improve computer-related technology. Despite substantial advances in computer processing power over the past years, some time series-related computing tasks may still take impractically long amounts of time, especially when many gigabytes, terabytes, petabytes, or exabytes of data are involved. In some embodiments, a time series service may improve a time series system, a multi-dimensional time series database, and/or graphical user interfaces for viewing and/or interacting with time series. The time series service may act as a middleware layer between an external requesting device, such as a graphical user interface and/or a library, and a multi-dimensional time series database. Accordingly, the time series service can handle computational processing that may otherwise have to be performed by a front-end or backend system. Thus, time series-related processing may be offloaded to the time series service which may enable the front-end or backend systems to perform less computational processing, have a lighter hardware footprint, and/or have less application logic.

The time series service may result in faster and/or more efficient responses to time series requests and/or queries. The time series service can receive a time series request that includes a time series expression. A time series system may respond to the time series request by executing the time series expression. However, the time series expression as originally submitted may be inefficient. In some embodiments, the time series service can rewrite and/or generate a new time series expression from the original time series expression. Execution of a new time series expression may advantageously result in a faster processing time and/or use less computing resources than execution of the originally submitted time series expression, which may improve computer-related technology.

The time series service may include logic or instructions that improve multi-dimensional time series databases. A time series service can include logic that enables time series expressions to be applied to time series that have different time units and/or that correspond to data that is stored at different frequencies, such as, 60 hertz or 60 times a second in contrast to 50 hertz or 50 times a second. In some time series systems that do not include a time series service, if a multi-dimensional time series database included time series data in different time units or in different frequencies, the time series system may be required to re-ingest the time series data into a common time unit, which may be computationally expensive and/or may require larger data storage. Thus, some time series service embodiments can handle time series requests that are related to time series of different time units that allows the underlying time series data to be efficiently stored in different time units.

The systems and methods described herein may be intrinsically tied to database and/or computer technology because such solutions may be related to communication over computer networks, Application Programming Interfaces, data processing, and/or time-series technology. The data processing techniques and solutions described herein may be intrinsically tied to time series databases. Thus, the processes for efficiently servicing time series requests and/or queries may be intrinsically tied to database technology.

FIG. 1A is a schematic block diagram of an overall system for providing real-time multi-dimensional data analysis to one or more users, or for automatic control of one or more systems. One such system 10 is shown, which may for example comprise any industrial or chemical machine, plant and/or process. One or more electrical or electronic sensors 12, 13 may be provided on, or integrated as part of, the system 10. The sensors 12, 13 may be for sensing and generating sampled data for transmission in one or more respective digital data streams 12A, 13A to a pre-processing system 180. The transmission of each digital data stream 12A, 13A may be over a wired or wireless data communications channel. For example, the system 10 or each of the sensors 12 may comprise a communication interface which may comprise an integrated services digital network (ISDN) card, a cable modem, a satellite modem, or another type of modem. As another example, the communication interface may be a local area network (LAN) card to provide a data communication connection to a compatible LAN (or WAN component to communicate with a WAN). Wireless links may also be implemented, e.g. using Bluetooth, WiFi or similar. In any such implementation, communication interface sends and receives electrical, electromagnetic or optical signals that carry the digital data streams 12A, 13A representing various types of information.

The received digital data streams 12A, 13A may be noisy and may generate unstructured data. The pre-processing system 180, which may also comprise a communication interface 14 appropriate for receiving the digital data streams 12A, 13A from the system 10, is configured to prepare the data sets contained within each said stream for storage in one or more databases 132A-132C (collectively referred to later on by reference numeral 132.)

The pre-processing system 180 comprises, in addition to the communication interface 13, a first messaging queue 15, a cleaner and parser 16, and a second messaging queue 17, that may be referred to as a parsed queue on account if it receiving the data sets subsequent to parsing. The pre-processing system 180 may also comprise memory providing cold storage 18, although this may be provided outside of the pre-processing system 180, for example as cloud storage.

The first messaging queue 15 may comprise stream processing software for handling real-time data feeds, such as the digital data streams 12A, 13A. The first messaging queue 15 may implement principles used throughout the system such as being distributed, highly available, durable, replicated and linear in order to allow check pointed roll-backs and fault-tolerance to network partitions and hardware failures, while maintaining the near real-time requirement of the pre-processing system 15. In turn, these principles provide (i) automated retries, if needed to acquire and pre-process data from a previous state if an error occurs, or if a connection to subsequent stages is lost, and (ii) parsing of unstructured data in near real-time with an event-based approach. Apache Kafka® is one such example software application that may be employed for the first messaging queue 15. Its purpose in this context is to allocate the different digital data streams 12A, 13A, or fragments thereof, to available subsequent processing nodes, for example nodes of the cleaner and parser 16, to keep subsequent processing stages moving in real-time. It provides multiple queues and parallel allocation to said available subsequent parallel processing stages.

The cleaner and parser 16 may be implemented as one or as separate processing stages.

The purpose of cleaning the digital data streams 12A, 13A is to remove or filter noise that may be present in the data streams; this may be due to inherent characteristics of the sensors 12, 13 themselves and/or the communications channel between the system 10 and the pre-processing system 180. The purpose of parsing the respective digital data is generally to convert it from a raw, unstructured stream of data into one that is structured and hence suitable for storage in the one or more databases 132A-132C in a meaningful way that can be used by a time series service 190, to be described later on. Parsing in this context may involve using one or more ontologies, associated with the respective sensors 12, 13, for structuring the unstructured data into rows and columns having appropriate meaning and context. For example, if the sensor 12 is transmitting a digital data stream 12A representing temperature at sequential times, the ontology for that sensor may indicate that a first column represents the time index and a second column represents the temperature in a particular unit, e.g. degrees Celsius. If the sensor 13 is transmitting a digital data stream 13A representing multi-dimensional data, e.g. pressure and depth, then the ontology for that sensor may indicate that the first column represents the time index, the second column represents the pressure in a particular unit, and a third column represents a depth, assuming that is variable. The ontology may further represent the type of units represented by the data, and/or how particular rows and/or columns may be linked to other digital data streams. The output of the cleaner and parser is therefore cleaned and structured data from each received digital data stream 12A, 13A. In situations where the data is free of noise, no cleaning may be required. Multiple cleaning and/or parsing processors may be provided as part of this pre-processing stage 16 to handle the multiple parallel allocations from the first messaging queue 15.

The second messaging queue 17, or parsed queue, is similar in general function to the first queue 15 in that it may comprise stream processing software for handling real-time data feeds, such as the digital data streams 12A, 13A when parsed. As before, Apache Kafka® is an example software application that may be employed for the parsed queue 15. Its purpose in this context is to allocate the different cleaned and parsed digital data streams 12A, 13A, or fragments thereof, to available locations of the one or more databases 132A-132C, to keep subsequent processing stages moving in real-time. A general-purpose distributed messaging queue, such as Apache Kafka, allows multi-tenant consumers with individual check pointing, allowing clean data to be consumed by multiple time series databases along with other auditing services, while isolating failure to individual services. Consequently, this allows a horizontally elastic approach to scaling time series databases as stream rates or data throughput can attenuate rapidly. Practically, this provides a way for operators to rapidly upgrade and rollback individual services while maintaining the near real-time nature of the system.

The one or more databases 132A-132C may be any form of relational database, and one or more of said databases may be a multi-dimensional database, optimized for online analytical processing (OLAP) applications. The one or more databases 132A-132C may comprise configuration data which makes said databases visible over a network to the time series service 100 described below.

The cold storage system 18 may be populated with the raw, unparsed data from the communication interface 14. As such, it may be used to populate missing or erroneous data if and when discovered during allocation to the one or more databases 132A-132C and/or during analysis. The cold storage system 18 may also be used for auditing or carrying out historical analyses—i.e. applications that do not have the need to be real-time. This is important in situations where users are carrying out academic exercises on historical events and deriving new insights from past events, which typically includes cycles of forming and proving/disproving hypotheses. Such insights are then used to influence the near real-time workflows.

Figure 1B:
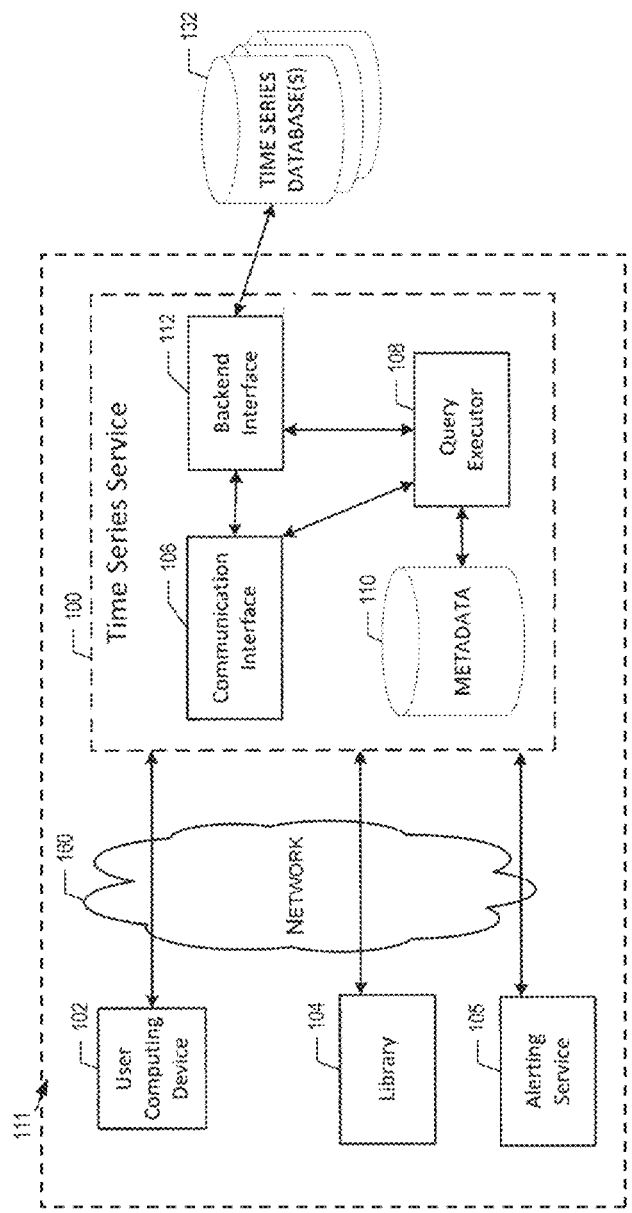
FIG. 1B illustrates a time series service, according to some embodiments of the present disclosure, as part of a database environment.

FIG. 1B illustrates the time series service 100, according to some embodiments of the present disclosure, as part of a database environment 111. In the embodiment of FIG. 1B, the database environment 111 can include a network 160, the time series service 100, a user computing device 102, a library 104, and an alerting service 105. As indicated in FIG. 1A, the time series service 100 may communicate with the one or more time series databases 132. Various communications between these devices are illustrated. For example, the user computing device 102 may send user input, such as time series queries and/or expressions generated from user interface selections, to the time series service 100. The user computing device 102 may enable a user to interact with time series data using a graphical user interface, such as the graphical user interface 200 of FIGS. 2A-2C. Additionally or alternatively, the user computing device 102 may present a time series report. The time series report presentation system may communicate with the time series service 100 to retrieve and present time series data.

The time series service 100 can include a communication interface 106, a query executor 108, metadata storage 110, and a backend interface 112. The backend interface 112 may comprise a proxy. The communication interface 106 can receive time series requests from at least one of the user computing device 102 and/or the library 104. An example library 104 is a software library, such as Python, for performing time series operations. A programmer can write custom time series algorithm using the library 104. The time series requests can be processed by the time series service 100. The query executor 108 can process the requests. Example processing includes generating efficient time series expressions, dynamically converting time series data, identifying which time series databases to query, causing time series data to be populated in one or more time series databases, and/or other operations as described herein. In processing the time series requests, the query executor 108 may access the metadata storage 110, which may store metadata such as the respective units for time series data. The query can execute one or more queries and/or backend requests via the backend interface 112. The backend interface 112 can transmit the generated queries and/or backend requests to the one or more time series databases 132 and receive responses from the backend systems. In responding to a time series request, the time series service 100 may execute multiple queries, as described herein, to generate the final results for a response. The responses can be transmitted to the communication interface 106, which may further transmit to the user computing device 102 and/or the time series library. Additionally or alternatively, the backend responses may be transmitted to the query executor 108 for further processing before the response data is transmitted to the user computing device 102 and/or the time series library.

The metadata storage 110 stores metadata regarding time series, such as the units of time series. In some embodiments, a time series database 132 may not include one or more units of a time series. For example, the time series database 132 stores a series of (timestamp, value) pairs, which may not necessarily include data indicative of a particular time unit or other unit for the series. In other embodiments, the time series database 132 may store data indicative of the time unit for a time series. For example, a time series may be stored in the time series database 132 in a particular time unit. In some embodiments, the time series service 100 can include a metadata service (not illustrated in FIG. 1B.) The metadata service can access the metadata storage 110 to provide metadata regarding one or more time series.

The metadata storage 110 may store identifiers corresponding to each time series stored in a time series databases 132. In association with each identifier, the metadata may also store the location of each time series to enable its retrieval when required by a received query. The metadata may be generated and stored when a new time series is stored in a time series database 132. The metadata storage 110 may also be used for indexing and searching purposes, that is, to allow users to search for one or more time series stored in the time series databases 132 by means of metatags etc.

In some embodiments, the alerting service 105 may communicate with the time series service 100. The alerting service 105 can submit time series requests to the time series service 100. The alerting service 105 can repeatedly submit time series requests. The alerting service 105 can include logic to generate alerts if the retrieved time series data satisfies one or more conditions. An example condition includes some of the time series data exceeding a threshold. The alerting service 105 can then generate and/or transmit a corresponding notification. Thus, the time series service 100 acting as a middleware layer can enable improved alerting.

Example Time Series Requests

Figure 2A:
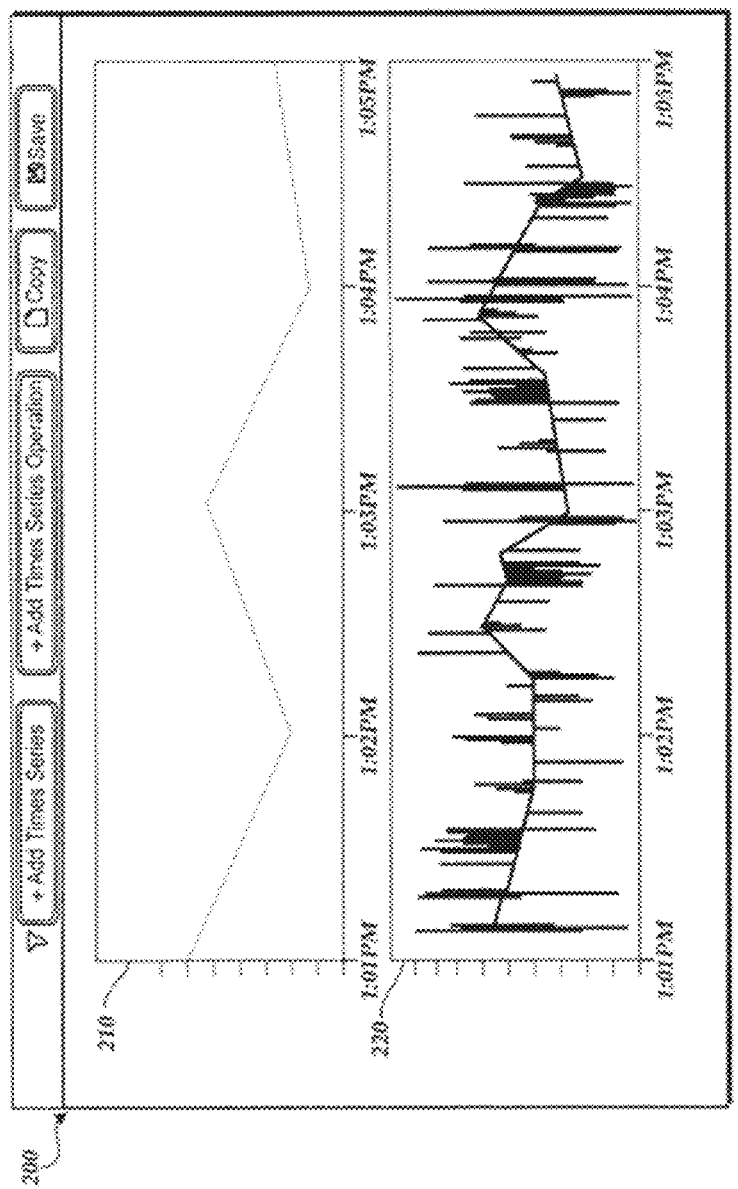
FIG. 2A illustrates a user interface that depicts a graph of time series data that may be generated and displayed by a computing device, according to some embodiments of the present disclosure.

As described herein, an external device may transmit requests to the time series service 100 through a graphical user interface and/or a library. FIG. 2A illustrates a user interface 200 that depicts graphs of time series data that may be generated and displayed by a computing device, such as the user computing device 102 of FIGS. 1A and 1B. A user interaction with the user interface 200 may cause requests be sent to the time series service 100.

In FIG. 2A, the user interface 200 includes a first graph 210 and a second graph 220. Each of the first graph 210 and the second graph 220 represents a respective dimension or variable against a time axis, which in this case happen to be aligned. In some embodiments, the first graph 210 and the second graph 220 may be overlaid onto a single graph, which may require the vertical axis to be scaled appropriately.

The user interface 200 can enable a user to retrieve time series data, query and/or find a time series, view time series data at different periods of time, view time series data at different zoom levels, and/or simultaneously view different time series data over the same time period. In a vehicle sensor context, a user can investigate fuel consumption over time for one or more vehicles using the user interface 200. In the user interface 200, the user can then further zoom in on fuel consumption data generated from a particular fuel pump. Other time series contexts include any situation where a physical device, such as mechanical hardware, can be monitored and measurement data can be collected. An example first graph 210 corresponds to time series data for water allocation values over time. An example second graph 220 corresponds to time series data for temperature values over time.

Figure 2C:
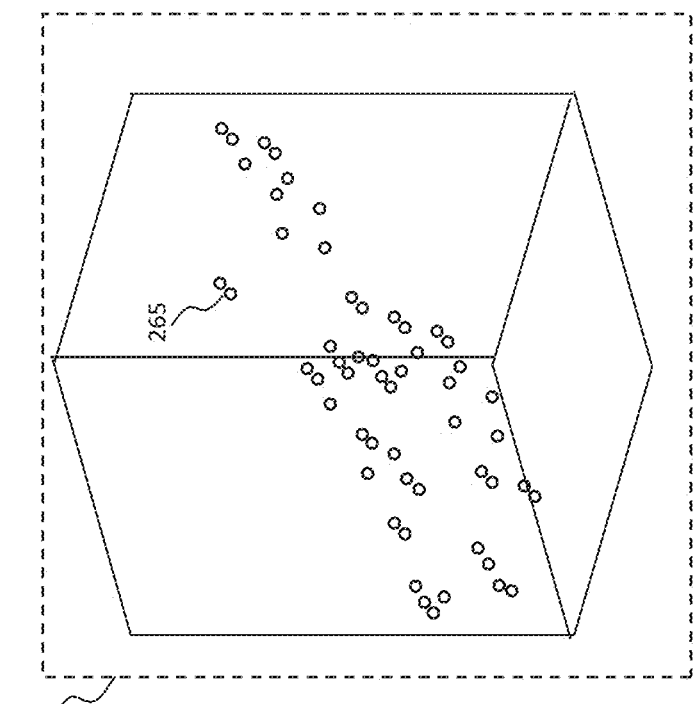
FIG. 2C illustrates another user interface that comprises a three-dimensional scatter plot, according to some embodiments of the present disclosure.
Figure 2B:
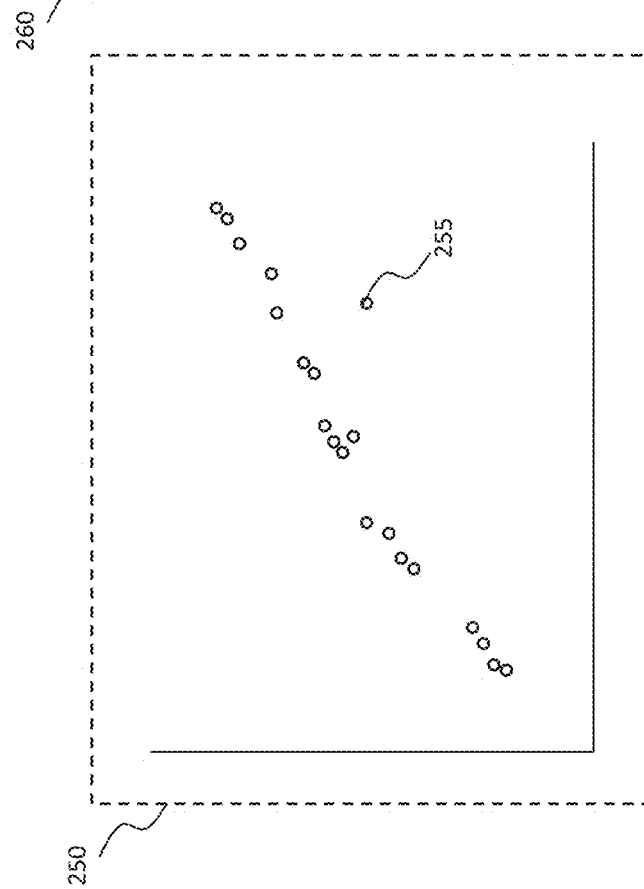
FIG. 2B illustrates another user interface that may result from a query entered at a computing device, according to some embodiments of the present disclosure.

FIG. 2B represents another user interface 250 that may result from a query entered at the user computing device 102. The query may request correlation or regression analysis of two or more dimensions of stored data over a common time period. The result may comprise a scatter plot shown in FIG. 2B, showing the relationship between the two dimensions or variables for a single slice of another variable, e.g. time. Further time slices may be generated for subsequent time intervals. One variable may represent, for example, temperature of the system 10 and the other may represent a variable pressure of the system. Scatterplots are particularly useful in the context of multi-dimensional data in that correlations may be identified, regression analysis performed and outliers identified that may represent a surprising event requiring attention in real-time. For example, it will be seen from the user interface 250 that an outlier is present, indicating that, at this particular time slice, an event requiring attention or action has been identified.

FIG. 2C represents another user interface 260 that comprises a three-dimensional scatter plot, showing the relationship between all three variables, for example comprising one axis for temperature, another axis for pressure and another axis for time. Again, one or more outliers 265 can be identified and attention or action prompted or performed. The FIG. 2C user interface 260 is more useful in some respects than the FIG. 2B user interface 250 in that time index is also present.

Other forms of scatterplots are known, for example using different notations for additional dimensions, e.g. using squares or other shapes instead of circles for plot points.

Figure 5:
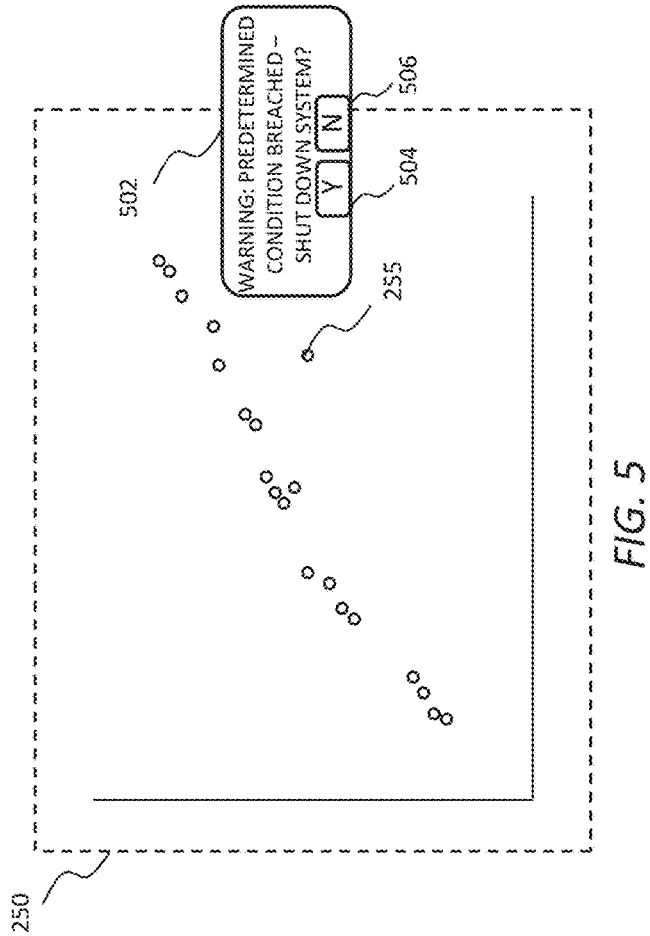
FIG. 5 illustrates a user interface displaying a prompt for user action, according to some embodiments of the present disclosure.

In some embodiments, one or more predetermined conditions may be specified, either by default or by a user via the user computing device 102. For example, the one or more conditions may relate to alerting a user through one or more of the user interfaces 200, 250, 260, or another user interface, if an outlier is detected from the correlation and/or regression analysis. For example, if an outlier of, say, 20% deviation from some average or expected value is detected, this may trigger an alert condition. Responsive to detection of an alert condition, the user interface 200, 250, 260 may issue a prompt as to the detected condition, possibly with additional information such as which parameters are affected. In some embodiments, the prompt may be a guided prompt to give the user the option of shutting down or otherwise controlling one or more parts of the system 10, for example to temporarily go offline or pause their current operation. In some embodiments, the alert may be issued to the alerting service 105 which may automatically cause one or more parts of the system 10 to shut down or go temporarily offline. In some embodiments, the prompt may simply be a prompt for further investigation, for example to investigate the reliability of the sensor or sensors 12, 13 concerned. An example prompt is shown in FIG. 5.

In some embodiments, the time series service 100 may have access to diagnostic data which stores data representing previously-encountered outlier incidents, and may predict therefrom what a currently-detected condition relates to. For example, if the multi-dimensional data produces one or more outliers that correspond to a previous occurrence of the one or more outliers, then an indication of what that previous occurrence related to and/or how it was resolved may be prompted.

The one or more time series databases 132A-132C may represent a plurality of possible sources of time series data sets. These are made visible to the time series service 100 by means of configuration data or a configuration file. In this respect, the time series service 100 is configured so as to accept data from any structured data source that carries an appropriate configuration data or file. The time series service 100 may query or poll any data source within communications range of it, or in a given domain, to identify the presence of said configuration data or file and thereafter may collect data from said data sources if requested in a query. Thus, in the case illustrated in FIGS. 1A and 1B, it may be assumed that the time series databases 132A-132C have said configuration data or file to enable data to be collected therefrom.

FIGS. 3A-3C illustrate diagrams of example time series requests and time series expressions.

In FIG. 3A, the data environment 300 can include a time series request 310 and a generated time series expression 314. The time series requests 310 can be generated and/or sent from the user computing device 102 and/or the library 104 of FIG. 1B. The time series request 310 can include a time series expression 312 and one or more parameters 314. As described herein, example one or more parameters 314 are interpolation configuration parameters that indicate a type of interpolation to be performed. The interpolation configuration parameter can instruct how the time series service 100 should perform interpolation. An example, but not limiting, data format for the time series request 310 is a JavaScript Object Notation (JSON) data format.

As illustrated, the time series request 310 and/or the time series expression 312 may be nested. For example, the time series request 310 and/or the time series expression 312 can include two or more nodes that may be linked. The two or more nodes of the time series of request 310 may be in a tree format. Example nodes include nodes that correspond to one or more time series operations, a combined operation, a query, and/or one or more time series, such as one or more time series indicators. Example operations can include mathematical operations, such as, but not limited to, an addition operation, a subtraction operation, a division operation, a multiplication operation, a ratio determination operation, and/or a square root operation; statistical operations, such as, a zScore operation, a standard deviation operation, an average operation, a median operation, a mode of operation, and/or a range operation; and/or other functions including, but not limited to, a maximum operation, a minimum operation, and/or customized functions such as user-defined functions. An example time series indicator can include an identifier, such as a numerical and/or string identifier, that references a particular time series. The time series request 310 can be in a nested JSON data format. The time series expression 312 can describe the request that the time series service 100 may respond to. In some embodiments, the time series service 100 and/or the time series database 132 queries time series data and/or performs one or more operations as represented by the time series expression 312.

The time series service 100 may optionally generate a new time series expression to be performed instead of the original time series expression since the new time series expression may be more efficient than the original time series expression.

The time series expression 312 can include multiple operations, such as a first operation, a second operation, a third operation, etc. As illustrated, a first operation 305A may be an arithmetic operation and may indicate the addition of data values from a first time series as referenced by the first time series indicator 302B (such as the time series data displayed in the graph 210 of FIG. 2A) with data values from a second time series as referenced by the second time series indicator 304 (such as the time series data displayed in the graph 220 of FIG. 2A.) The second operation may be another arithmetic operation 305B and may indicate the division of data values from the first time series as referenced by the time series indicator 302A (such as the time series displayed in the graph 210 of FIG. 2A) over the results from the first operation.

A new set of time series data 306 may be the output of the evaluation of the time series expression 312. The time series service 100 may evaluate the time series expression 312 and may return the time series data 306. The time series data 306 may be presented in a user interface, such as those shown in any of FIGS. 2A-2C. While two arithmetic operations are depicted, this is not meant to be limiting. Indeed, in the context of performing correlation and/or regression analysis on two or more dimensions of time series data, one or more of these analysis operations may be used in the shown examples to produce one or more scatter plots, as indicated in FIGS. 2B and/or 2C. A time series expression may include any number of nested or un-nested operations.

In some embodiments, the time series service 100 can rewrite and/or generate a new time series expression from the time series expression that was submitted in the time series request. Execution of a new time series expression may advantageously result in a faster processing time and/or use less computing resources than execution of the originally submitted time series expression. The time series service 100 can use an optimizer to process the submitted time series expression to generate a more efficient time series expression. The time series service 100 can generate a new time series expression using metadata associated with one or more time series referenced in the original time series expression. For example, the metadata may indicate which data sources where the time series data exists and/or can be retrieved.

An example method for generating a more efficient time series expression is to reduce a number of nodes in the time series expression. The time series service 100 can identify two or more nodes in the time series expression that correspond to a time series operation. In the example, the nodes 305A and 305B corresponds to the time series operations of addition and division. The time series service 100 can generate a combined operation node from the identified two or more nodes. An example combined operation node is the node 307, which can represent both the addition and division operations in a single node to the respective input time series. In some embodiments, less nodes in the time series expression may be more efficient for the time series service 100 and/or the backend, such as the one or more time series databases. For example, instead of intermediary processing nodes, the data and/or operations can be pipelined into a node that results in faster processing and/or the use of less computational resources. Further, combining computations, such as arithmetic, into a node may also be further efficient. Accordingly, the time series service can generate the time series expression 314 from the original time series expression 312, which may be rewritten in a form to be more efficient.

FIG. 3B illustrates a diagram for another time series request. In FIG. 3B, the data environment 320 can include a time series request 322. The time series of request 322 may enable efficient querying of time series data and/or performing one or more operations on the time series data. A time series request may explicitly include references to multiple time series and respective time series expression. However, in some embodiments, instead of including the explicit references to each of multiple time series, a more efficient time series expression may include a node query that can be executed by the time series service 100 to generate a fully planned time series expression.

As described herein, the time series service 100 may be applied in a context where sensors collect time series data. An example context includes time series data collected from vehicles, such as cars, planes, boats, or trucks. In a trucking example, a request may be generally directed towards determining a maximum speed of multiple shipping trucks along a particular shipping route, such as from Los Angeles, California to Portland, Oregon. In one example, a user may use a graphical user interface to pull back a list of deliveries between LA and Portland, which may result in 100 time series being returned to the graphical user interface. Accordingly, while not illustrated, a corresponding time series requests may include a time series expression with 100 time series nodes corresponding to the retrieved 100 time series.

However, in contrast to the previous example, a graphical user interface of FIG. 3B may instead send the time series request 322. The time series request 322 includes a time series expression 324 and one or more parameters 325. As illustrated, instead of including the 100 nodes of the previously example, the time series expression 324 can include a query node 326 and a time series operation node 328. The query node 326 can include instructions that are associated with a particular query. Accordingly, the time series service 100 can execute the query node 326 and retrieve the corresponding data instead of having to transmit the initial time series data to the requesting device, which may reduce network bandwidth and/or reduce or offload computer processing from the requesting device. The retrieved corresponding data can include identifiers corresponding to the 100 time series nodes. The time series service 100 and/or a time series database can apply the time series operation corresponding to the node 328 to the results from the query node 326 that generates the output 330. Example output 330 includes one or more data values or time series. In the example, the time series service 100 determines a maximum value from each of the retrieved 100 time series that results in the output data values 330. Accordingly, the time series service 100 may execute multiple queries against the time series database to respond to a time series request. Thus, the time series service 100 may in effect rewrite the time series expression 324 to be similar to the time series expression 314 of FIG. 3A. For example, the rewritten time series expression may include multiple time series nodes (here, 100 time series nodes) connected to an operation node (here, a maximum node).

FIG. 3C illustrates a diagram for another time series request. In FIG. 3C, the data environment 340 can include a time series request 350. A time series expression 352 may specify a first time series indicator 356A and a second time series indicator 356B., each of which may refer to respective dimensions. A time series operation node 358 may relate to a correlation operation to generate one or more scatter plots as shown in FIGS. 2A and/or 2B or to perform related controlling or alerting operations as described above.

Figure 4:
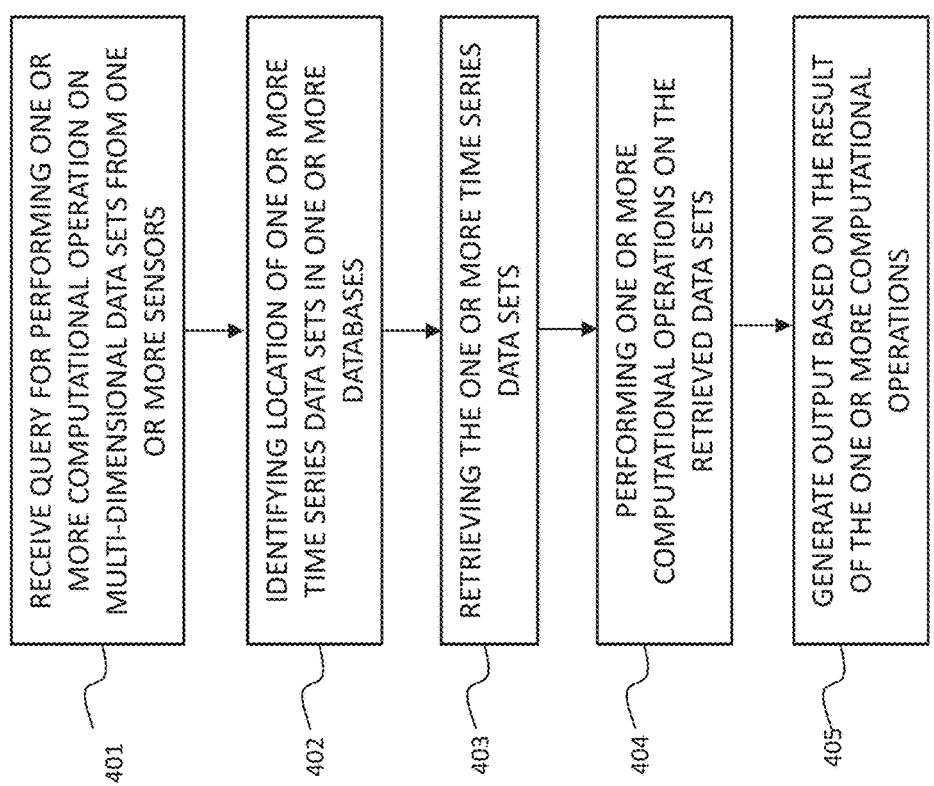
FIG. 4 is a flow diagram showing processing operations that may be performed, according to some embodiments of the present disclosure.

FIG. 4 is a flow diagram showing processing operations that may be performed in example embodiments. The processing operations may be performed using hardware, software or a combination thereof.

A first operation 401 may comprise receiving a query for performing one or more computational operations on one or more data sets representing multi-dimensional time series data collected in real-time from one or more sensors associated with one or more technical systems.

A second operation 402 may comprise identifying the location of the one or more time series data sets in one or more databases.

A third operation 403 may comprise retrieving the one or more time series data sets from the identified one or more multi-dimensional databases.

A fourth operation 404 may comprise performing the one or more computational operations on the retrieved time series data sets.

A fifth operation 405 may comprise generating output based on the result of the one or more computational operations indicative of one or more states of the one or more technical systems with respect to time.

FIG. 5 shows the user interface 250 as shown in FIG. 2B, including a generated alert prompt 502 indicating to the user via the user interface that a predetermined breach has been detected and offering the user the option of shutting down the system, or part of the system, via yes or no buttons 504, 506. Other forms of alert prompt may be provided, in any suitable format or style.

Implementation Mechanisms

The various computing device(s) discussed herein, such as the pre-processing system 180 (including its constituent elements 14-17), time series service 100, the communication interface 106, the query generator 108, the backend interface 112, and/or the user computing device 102, are generally controlled and coordinated by operating system software, such as, but not limited to, iOS, Android, Chrome OS, Windows XP, Windows 7, Windows 8, Unix, Linux, or other compatible operating systems. In other embodiments, the computing devices may be controlled by a proprietary operating system. Conventional operating systems control and schedule computer processes for execution, perform memory management, provide file system, networking, I/O services, and provide a user interface functionality, among other things. The time series service 100 may be hosted and/or executed on one or more computing devices with one or more hardware processors and with any of the previously mentioned operating system software.

Figure 6:
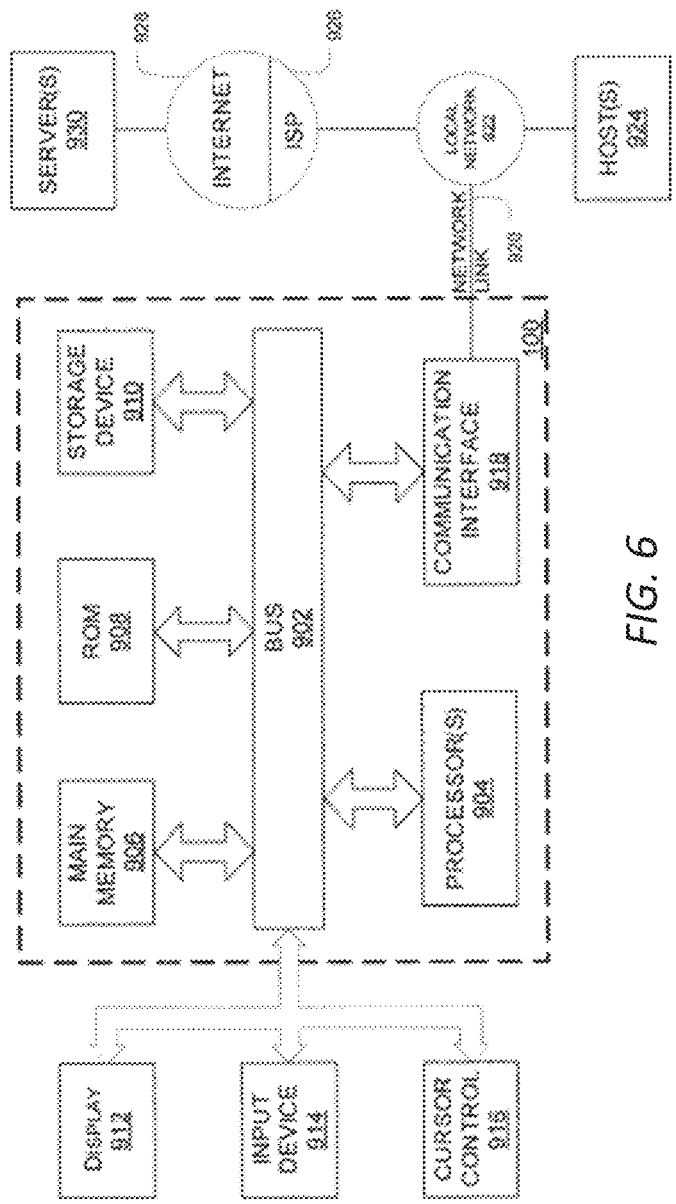
FIG. 6 is a block diagram representing example components of a computer system providing, for example, a time series service according to some embodiments of the present disclosure.

FIG. 6 is a block diagram that illustrates example components of the time series service 100. While FIG. 6 refers to the time series service 100, any of the other computing devices, modules, services, and/or user computing devices discussed herein may have some or all of the same or similar components.

The time series service 100 may execute software, e.g., standalone software applications, applications within browsers, network applications, etc., whether by the particular application, the operating system, or otherwise. Any of the systems discussed herein may be performed by the time series service 100 and/or a similar computing system having some or all of the components discussed with reference to FIG. 6.

The time series service 100 includes a bus 902 or other communication mechanism for communicating information, and a hardware processor, or multiple processors, 904 coupled with bus 902 for processing information.

The time series service 100 also includes a main memory 906, such as a random access memory (RAM), cache and/or other dynamic storage devices, coupled to bus 902 for storing information and instructions to be executed by processor(s) 904. Main memory 906 also may be used for storing temporary variables or other intermediate information during execution of instructions to be executed by processor(s) 904. Such instructions, when stored in storage media accessible to processor(s) 904, render the time series service 100 into a special-purpose machine that is customized to perform the operations specified in the instructions. Such instructions, as executed by hardware processors, may implement the methods and systems described herein for generating and/or executing efficient queries.

The time series service 100 further includes a read only memory (ROM) 908 or other static storage device coupled to bus 902 for storing static information and instructions for processor(s) 904. A storage device 910, such as a magnetic disk, optical disk, or flash drive, etc., is provided and coupled to bus 902 for storing information and instructions. The communication interface 106, the query generator 108, and/or the backend interface 112 of FIG. 1 may be stored on the main memory 906 and/or the storage device 910.

The time series service 100 and/or user computing device 102 may be coupled via bus 902 to a display 912, such as a LCD display or touch screen, for displaying information to a computer user. An input device 914 is coupled to bus 1002 for communicating information and command selections to processor 904. One type of input device 914 is a keyboard including alphanumeric and other keys. Another type of input device 914 is a touch screen.

In general, the word "instructions," as used herein, refers to logic embodied in hardware or firmware, or to a collection of software units, possibly having entry and exit points, written in a programming language, such as, but not limited to, Java, Lua, C, C++, or C #. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The time series service 100, or components of it, such as the communication interface 106, the query generator 108, and/or the backend interface 112 of FIG. 1, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Bus 902 carries data to main memory 906, from which the processor(s) 904 retrieves and executes the instructions. The instructions received by main memory 906 may retrieve and execute the instructions. The instructions received by main memory 906 may optionally be stored on storage device 910 either before or after execution by computer hardware processor(s) 904.

The time series service 100 also includes a communication interface 918 coupled to bus 902. Communication interface 918 provides a two-way data communication coupling to a network link 920 that is connected to a local network 922. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from the time series service 100, are example forms of transmission media.

A network, such as the network 160 of FIG. 1, may comprise, but is not limited to, one or more local area networks, wide area network, wireless local area network, wireless wide area network, the Internet, or any combination thereof.

The time series service 100 can send messages and receive data, including program code, through the network (s), network link 920 and communication interface 918. In the Internet example, a server 930 might transmit a requested code for an application program through Internet 928, ISP 926, local network 922 and communication interface 918.

The received code may be executed by processor(s) 904 as it is received, and/or stored in storage device 910, or other non-volatile storage for later execution.

In some embodiments, the time series service 100 and/or the user computing device 102 may operate in a distributed computing environment including several computer systems that are interconnected using one or more computer networks. The time series service 100 and/or the user computing device 102 could also operate within a computing environment having a fewer or greater number of devices than are illustrated in FIGS. 1A, 1B and/or FIG. 6. Thus, the depiction of time series service 100 and/or the user computing device 102 in FIGS. 1A, 1B and/or FIG. 6 should be taken as illustrative and not limiting to the present disclosure. For example, the time series service 100 and/or the user computing device 102 could implement various Web services components and/or peer to peer network configurations to implement at least a portion of the processes described herein. For example, multiple servers and/or processes may process and/or analyze items and/or present a user interface in a distributed manner, as described herein.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method, comprising:
    receiving real-time streaming data originating from a plurality of sensors associated with one or more technical systems, the real-time streaming data representing one or more multi-dimensional time series data sets;
    prior to parsing and cleaning the real-time streaming data, storing the real-time streaming data in a cold storage as raw data received from the plurality of sensors, the raw data comprising unparsed and uncleaned data;
    cleaning the real-time streaming data;
    structuring the real-time streaming data according to a format associated with an ontology associated with the plurality of sensors;
    storing the structured real-time streaming data in one or more time-series databases;
    in response to identifying missing data or erroneous data stored in the one or more time-series databases, updating the structured real-time streaming data in the one or more time-series databases with data from the cold storage;
    receiving a query for performing one or more computational operations on the structured real-time streaming data representing the one or more multi-dimensional time series data sets collected in real-time from the plurality of sensors associated with the one or more technical systems;
    identifying a location of the one or more multi-dimensional time series data sets in one or more databases based on accessing metadata associated with the one or more multi-dimensional time series data sets in the one or more databases, said one or more databases being pre-registered with a middleware analysis platform, the metadata including identifiers of the one or more multi-dimensional time series data sets and their respective storage locations in the one or more databases;
    retrieving the one or more multi-dimensional time series data sets from the one or more databases;
    performing the one or more computational operations on the one or more multi-dimensional time series data sets retrieved from the one or more databases to generate a resultant time series data set;
    displaying, via an interactive graphical user interface, a multi-dimensional visualization of the resultant time series data set to permit a user to analyze one or more states of the one or more technical systems;
    monitoring the resultant time series data set to detect a predetermined condition of the resultant time series data set, wherein the predetermined condition is based on a relationship between the multi-dimensional time series data sets;
    in response to detecting the predetermined condition of the resultant time series data set, displaying, via the interactive graphical user interface:
        information relating to the predetermined condition of the resultant time series data set and the one or more technical systems, and
        indications of one or more system operations to be performed on the one or more technical systems; and
    in response to receiving one or more user selections via the interactive graphical user interface of the indications of the one or more system operations, performing one or more system operations on the one or more technical systems according to the one or more user selections.

2. The method of claim 1 further comprising:
accessing diagnostic data comprising information relating to a historical predetermined condition and an indication of how the historical predetermined condition was resolved, wherein the historical predetermined condition comprises a historical data outlier corresponding a data outlier of the resultant time series data set;
determining the information relating to the predetermined condition from the information relating to the historical predetermined condition; and
determining the one or more system operations from the indication of how the historical predetermined condition was resolved.

3. The method of claim 1, further comprising performing an automatic operation on the one or more technical systems responsive to the predetermined condition being detected.

4. The method of claim 1, wherein the multi-dimensional visualization of the resultant time series data set comprises one or more multi-dimensional graphs.

5. The method of claim 1, wherein the multi-dimensional visualization of the resultant time series data set includes one or more scatter plots.

6. The method of claim 1, wherein the multi-dimensional visualization of the resultant time series data set includes a sequence of time slices.

7. Non-transitory computer readable media including computer-executable instructions which, when executed by a computing system, cause the computing system to perform operations comprising:
receiving real-time streaming data originating from a plurality of sensors associated with one or more technical systems, the real-time streaming data representing one or more multi-dimensional time series data sets;
prior to parsing and cleaning the real-time streaming data, storing the real-time streaming data in a cold storage as raw data received from the plurality of sensors, the raw data comprising unparsed and uncleaned data;
cleaning the real-time streaming data;
structuring the real-time streaming data according to a format associated with an ontology associated with the plurality of sensors;
storing the structured real-time streaming data in one or more time-series databases;
in response to identifying missing data or erroneous data stored in the one or more time-series databases, updating the structured real-time streaming data in the one or more time-series databases with data from the cold storage;
receiving a query for performing one or more computational operations on the structured real-time streaming data representing the one or more multi-dimensional time series data sets collected in real-time from the plurality of sensors associated with the one or more technical systems;
identifying a location of the one or more multi-dimensional time series data sets in one or more databases based on accessing metadata associated with the one or more multi-dimensional time series data sets in the one or more databases, said one or more databases being pre-registered with a middleware analysis platform, the metadata including identifiers of the one or more multi-dimensional time series data sets and their respective storage locations in the one or more databases;
retrieving the one or more multi-dimensional time series data sets from the one or more databases;
performing the one or more computational operations on the one or more multi-dimensional time series data sets retrieved from the one or more databases to generate a resultant time series data set;
displaying, via an interactive graphical user interface, a multi-dimensional visualization of the resultant time series data set to permit a user to analyze one or more states of the one or more technical systems;
monitoring the resultant time series data set to detect a predetermined condition of the resultant time series data set, wherein the predetermined condition is based on a relationship between the multi-dimensional time series data sets;
in response to detecting the predetermined condition of the resultant time series data set, displaying, via the interactive graphical user interface:
information relating to the predetermined condition of the resultant time series data set and the one or more technical systems, and
indications of one or more system operations to be performed on the one or more technical systems; and
in response to receiving one or more user selections via the interactive graphical user interface of the indications of the one or more system operations, performing one or more system operations on the one or more technical systems according to the one or more user selections.

8. The non-transitory computer readable media of claim 7, wherein the computer-executable instructions, when executed by the computing system, cause the computing system to perform operations comprising:
accessing diagnostic data comprising information relating to a historical predetermined condition, and an indication of how the historical predetermined condition was resolved, wherein the historical predetermined condition comprises a historical data outlier corresponding to a data outlier of the resultant time series data set;
determining the information relating to the predetermined condition from the information relating to the historical predetermined condition; and
determining the one or more system operations from the indication of how the historical predetermined condition was resolved.

9. The non-transitory computer readable media of claim 7, wherein the computer-executable instructions, when executed by the computing system, cause the computing system to perform operations comprising performing an automatic operation on the one or more technical systems responsive to the predetermined condition being detected.

10. The non-transitory computer readable media of claim 7, wherein the multi-dimensional visualization of the resultant time series data set comprises one or more multi-dimensional graphs.

11. The non-transitory computer readable media of claim 7, wherein the multi-dimensional visualization of the resultant time series data set includes one or more scatter plots.

12. The non-transitory computer readable media of claim 7, wherein the multi-dimensional visualization of the resultant time series data set includes a sequence of time slices.

13. A computing system comprising one or more hardware processors configured to:
receive real-time streaming data originating from a plurality of sensors associated with one or more technical systems, the real-time streaming data representing one or more multi-dimensional time series data sets;

prior to parsing and cleaning the real-time streaming data, store the real-time streaming data in a cold storage as raw data received from the plurality of sensors, the raw data comprising unparsed and uncleaned data;

clean the real-time streaming data;

structure the real-time streaming data according to a format associated with an ontology associated with the plurality of sensors;

store the structured real-time streaming data in one or more time-series databases;

in response to identifying missing data or erroneous data stored in the one or more time-series databases, update the structured real-time streaming data in the one or more time-series databases with data from the cold storage;

receive a query for performing one or more computational operations on the structured real-time streaming data representing the one or more multi-dimensional time series data sets collected in real-time from the plurality of sensors associated with the one or more technical systems;

identify a location of the one or more multi-dimensional time series data sets in one or more databases based on accessing metadata associated with the one or more multi-dimensional time series data sets in the one or more databases, said one or more databases being pre-registered with a middleware analysis platform, the metadata including identifiers of the one or more multi-dimensional time series data sets and their respective storage locations in the one or more databases;

retrieve the one or more multi-dimensional time series data sets from the one or more databases;

perform the one or more computational operations on the one or more multi-dimensional time series data sets retrieved from the one or more databases to generate a resultant time series data set;

display, via an interactive graphical user interface, a multi-dimensional visualization of the resultant time series data set to permit a user to analyze one or more states of the one or more technical systems;

monitor the resultant time series data set to detect a predetermined condition of the resultant time series data set, wherein the predetermined condition is based on a relationship between the multi-dimensional time series data sets;

in response to detecting the predetermined condition of the resultant time series data set, display, via the interactive graphical user interface:
information relating to the predetermined condition of the resultant time series data set and the one or more technical systems, and
indications of one or more system operations to be performed on the one or more technical systems; and in response to receiving one or more user selections via the interactive graphical user interface of the indications of the one or more system operations, perform one or more system operations on the one or more technical systems according to the one or more user selections.

14. The computing system of claim 13, wherein the one or more hardware processors are configured to:
access diagnostic data comprising information relating to a historical predetermined condition and an indication of how the historical predetermined condition was resolved, wherein the historical predetermined condition comprises a historical data outlier corresponding to a data outlier of the resultant time series data set;
determine the information relating to the predetermined condition from the information relating to the historical predetermined condition; and
determine the one or more system operations from the indication of how the historical predetermined condition was resolved.

15. The computing system of claim 13, wherein the one or more hardware processors are configured to perform an automatic operation on the one or more technical systems responsive to the predetermined condition being detected.

16. The computing system of claim 13, wherein the multi-dimensional visualization of the resultant time series data set comprises one or more multi-dimensional graphs.

17. The computing system of claim 13, wherein the multi-dimensional visualization of the resultant time series data set includes one or more scatter plots.

18. The computing system of claim 13, wherein the multi-dimensional visualization of the resultant time series data set includes a sequence of time slices.

* * * * *